United States Patent Office 3,269,283
Patented August 30, 1966

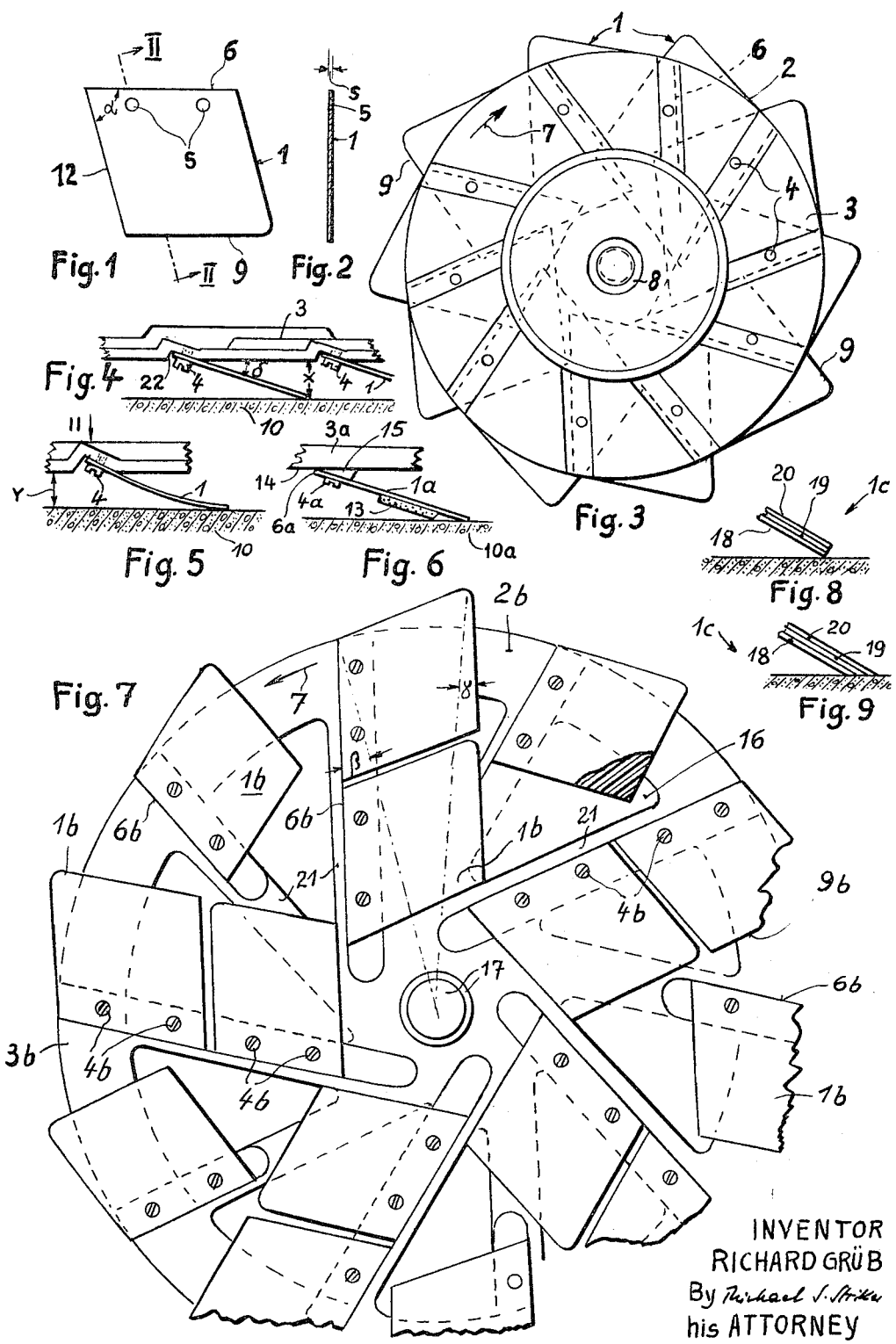

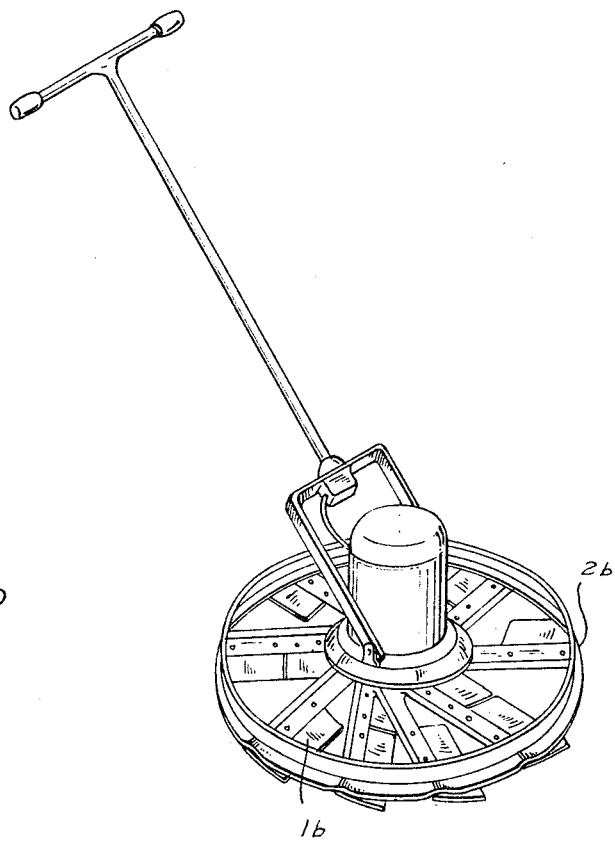

1

3,269,283
SURFACE FINISHING TOOL
Richard Grüb, Schorndorf, Wurttemberg, Germany
(Im Bruhl, Schlichten-Schorndorf, Germany)
Filed Mar. 13, 1962, Ser. No. 179,413
Claims priority, application Germany, Mar. 14, 1961,
G 31,817
3 Claims. (Cl. 94—45)

The present invention relates to a surface finishing tool, and more particularly to a rotary tool which is especially suited for smothitng or finishing the surfaces of the inner and outer walls, floors, ceilings and like structures consisting of wet plaster, mortar, artificial stone, concrete and like plastic material. The invention also relates to a novel blade which may be utilized in a surface finishing tool.

An important object of the invention is to provide a very simple, inexpensive and highly reliable tool for smoothing the surfaces of plasterwork and the like which is constructed and assembled in such a way that its blades may be readily removed, inspected or replaced, and which may be manufactured in any required size or shape so as to meet specific requirements for surface-finishing of walls, ceilings, floors or the like.

Another object of the invention is to provide a tool of the just outlined characteristics wherein the number of blades may be changed at will and which may be rapidly and conveniently converted for treatment of different materials.

A further object of the invention is to provide a surface smoothing or finishing tool which not only finishes but which also uniformly distributes the material of a wall or a like structure when it is put to actual use.

Still another object of the invention is to provide a surface finishing tool which may be utilized as a means for closing the pores along the surfaces of structures consisting of artificial stone or a similar porus material.

A concomitant object of the invention is to provide a novel blade which may be utilized in a tool of the above outlined characteristics.

A more specific object of the invention is to provide a specially constructed carrier for a surface finishing tool of the above outlined characteristics.

My invention is based on the recognition that the surfaces of plasterwork and the like may be treated to a superior finish if they are subjected to the action of inclined elastically deformable revolving vanes or blades which may be arranged in one or more annular groups. In response to deforming forces acting in a direction parallel with the axis about which the tool rotates, the blades are bent to a desired extent to thereby produce a uniform smoothing action. The tool may be of the portable type or it may be mounted on a wheel-mounted frame in the same way as a household vacuum cleaner.

The novel blades preferably assume the form of parallelograms, particularly rhombi or rhomboids, and they may consist of high-qualtity metal (preferably steel) or flexible plastic material. In some instances, the blades may consist of stacked laminations, or the tool may comprise different types of blades, e.g. an annular group of metallic blades, an annular group of plastic blades and an annular group of laminated metallic or plastic blades.

The novel features which are considered as character-

2 istic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a side elevational view of a metallic blade forming part of a surface finishing tool which embodies one form of my invention;

FIG. 2 is a transverse section through the blade as seen in the direction of arrows from the line II—II of FIG. 1;

FIG. 3 is a top plan view of a tool which comprises an annularly arranged group of blades of the type shown in FIGS. 1 and 2;

FIG. 4 is a fragmentary side elevational view of the tool showing its blades in a position they assume before being elastically deformed by contact with the surface of a material which is to be treated;

FIG. 5 illustrates the tool of FIGS. 3 and 4 in a position in which its blades are deformed by contact with the surface of the treated material;

FIG. 6 illustrates a portion of a different tool whose blades are provided with layers of elastically compressible felt-like material and which is especially suited for treatment of artificial stones and the like;

FIG. 7 is a fragmentary top plan view of a modified tool which comprises two annularly arranged groups of flexible blades and wherein the blades consist of plastic material;

FIG. 8 is a fragmentary side elevational view of a composite blade which consists of stacked laminations;

FIG. 9 illustrates the blade of FIG. 9 after a period of actual use when its trailing edge portion is partially worn away; and FIG. 10 is a perspective view of an apparatus which utilizes a tool of the type shown in FIG. 7.

Referring now in greater detail to the illustrated embodiments, and first to FIGS. 1 and 2, there is shown a vane or blade 1 which forms part of a material distributing and surface finishing tool 2 of the type shown in FIG. 3. The blade 1 consists of high-quality steel and assumes the form of a parallelogram, preferably a rhombus or rhombold. When not in actual use, the blade is preferably flat and is secured to the disk-shaped carrier 3 of the tool 2 by one or more screws 4 or the like, see FIGS. 4 and 5, these screws passing through apertures 5 provided in the region adjacent to the leading edge 6 of the blade 1. The thickness $s$ of the blade may be in the range of 0.1 to 0.3 mm. The tool 2 is assumed to rotate in the direction indicated by the arrow 7 and the blades 1 are secured to this tool in such a way that they form an annulus and that a portion of each blade projects radially outwardly beyond the circumference of the carrier 3. The carrier may be detachably connected to the output shaft 8 of a variable-speed electric motor of the portable type so that an operator may conveniently lift the entire apparatus in order to move the trailing edges 9 of the blades 1 into engagement with the surface of a wall 10 (see FIGS. 4 and 5) which requires precision finish. The wall 10 may comprise a layer of plaster, mortar or a like material which can be redistributed and smoothed by contact with the revolving blades 1. The non-illustrated electric motor or a similar power drive for the carrier 3 may be provided with a suitable handle to facilitate the work of a plasterer or a masonry worker who moves the revolving carrier 3 back and forth along the plasterwork whose surface requires precision finish. For example, the carrier 3 may be driven at a first speed of 50 r.p.m. at a second speed of 100 r.p.m. The angle delta enclosed by the planes of the blades 1 and the bottom face of the carrier 3 before the trailing edges 9 of the blades come into actual contact with a wall 10 is shown in FIG. 4. This angle may vary between say 15–30° depending on the configuration of the notches 22 in the bottom face of the carrier at which the blades 1 are respectively attached by screws and the elasticity of the blades is such that the distance $x$ between the trailing edges 9 and the bottom face of the carrier 3 (FIG. 4) is automatically reduced to $y$ (FIG. 5) when the carrier is subjected to pressure acting in the direction indicated by the arrow 11, i.e. parallel to the axis about which the tool 2 rotates.

The angle alpha enclosed by the leading edge 6 with one of the edges which are not parallel thereto may be in the range of 70–75°. FIG. 1 shows that the angle alpha enclosed by the lateral edge 12 with the leading edge 6 is about 75°. This angle is smaller if the angle (see the angle beta in FIG. 7) enclosed by the leading edge 6 with the radius of the carrier 3 is greater. The angle gamma (see FIG. 7) enclosed by the trailing edge 9 with the radius of the carrier 3 decreases as the portion of the blade adjacent to its trailing edge wears away.

In some instances, particularly when the tool of my invention is utilized for finishing the surfaces of artificial stones and the like, the outer side of each blade may be provided with a dense layer 13 of felt, foam rubber or similar elastically compressible material. This is shown in FIG. 6 which illustrates a blade 1a fixed to a slightly modified disk-shaped carrier 3a by screws 4a. The angle enclosed by the plane of the blade 1a with the bottom face 14 of the carrier 3a is determined by the configuration of a wedge-shaped insert 15 which is placed between the leading edge 6a and the bottom face 14. The layer 13 closes the pores along the surface of the wall 10a which is being treated by a tool of the type shown in FIG. 6. Of course, the layer 13 will wear away after a certain period of actual use but the blade 1a is readily detachable so as to be replaced by a new blade when the layer 13 is destroyed. If desired, the detachable connection between the blade 1 or 1a and its carrier 3 or 3a may assume the form of a bayonet lock, of suitable clamps or the like. The layer 13 may but need not cover the entire outer side of the blade 1a. This layer is particularly effective if the plasterwork whose surface requires treatment is comparatively thin.

FIG. 7 illustrates a tool 2b which comprises a carrier 3b and blades 1b arranged in two concentric annular groups. The blades are secured to the front end face of the carrier 3b by pairs of screws 4b. This carrier preferably consists of light metal, e.g. aluminum or aluminum alloy, and is provided with weight-reducing cutouts 16. It is assumed that the tool 2b comprises an outer annular group of ten equidistant blades and an inner annular group of five equidistant blades. These blades are detachably secured to ribs 21 which are separated from each other by the cutouts 16. As shown in FIG. 7, the leading edges 6b of the blades 1b enclose with the radii extending to the outer ends of the respective leading edges angles beta whose magnitude may be between 10–30°. The same applies to the angles gamma enclosed by the trailing edges 9b and by the radii extending to the outer ends of the trailing edges. The outer portion of each blade 1b adjacent to its surface-engaging trailing edge 9b projects beyond the circumference of the carrier 3a.

The blades 1b are assumed to consist of elastic plastic material whose thickness may be in the range of 1–2 mm. The tool 2a is preferably mounted at and is detachable from the free end of an elongated handle or shaft 17 which is driven by an electric motor or the like (see FIG. 10) to transmit motion to the carrier 2b and which preferably comprises two telescopically connected sections enabling an operator to change the length of the handle. This is of importance when the tool of my invention is utilized for finishing the surfaces of floors and the like because the operator may reach distant zones of the floor without stepping onto the newly finished or still soft material of the floor. Of course, the carrier 36b of FIG. 7 may be provided with three or more annularly arranged groups of blades 1b.

FIG. 8 illustrates a portion of a laminated or multilayer blade 1c which consists of stacked laminations or sheets 18, 19, 20. The laminations may but need not be glued or otherwise secured to each other. After a certain period of actual use, the trailing edge portion of the blade 1c is worn away in a manner as shown in FIG. 9. Blades of the type shown in FIGS. 8 and 9 may form the outer annular group of blades in the tool 2b of FIG. 7.

It will be noted that the outermost ends of the blades 1b forming the inner annular group of the tool 2b shown in FIG. 7 extend radially beyond the innermost ends of the blades which form the outer annular group. This is of advantage because the tool 2b will not leave any annular scratches or other marks when the blades 1b engage the surface of a wall or the like since the working range of the inner blades overlaps the working range of the outer blades or vice versa.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A surface finishing tool, comprising a rotary disk-shaped carrier having a bottom face; a plurality of substantially flat flexible blades adjacent to said bottom face, each of said blades having a leading edge portion closer to and a surface-engaging trailing edge portion more distant from said bottom face, said blades arranged in at least one annular group about the axis and having portions projecting beyond the circumference of said carrier, each of said blades of said finishing tools having substantially the shape of a parallelogram and arranged in such a manner that a leading radial line drawn through the outer end of the leading edge and a trailing radial line drawn through the outer end of the trailing edge are located entirely within the respective parallelogram-shaped blade and form with the leading and trailing edge of said blade, respectively, small angles and means for detachably connecting the leading edge portions of said blades to said carrier.

2. A surface finishing tool as set forth in claim 1, each blade comprising at least one lamination of flexible material and having a work-engaging outer side and a layer of elastically deformable felt-like material secured to and at least partially covering said outer side.

3. A surface finishing tool, comprising a rotary carrier having a bottom face; a plurality of substantially flat flexible blades adjacent to said bottom face, each of said blades having a leading edge portion having an outer end and a surface-engaging trailing edge portion substantially parallel with the respective leading edge portion, said leading edge portions closer to said bottom face than said trailing edge portions and each leading edge portion enclosing an angle of between 10 to 30 degrees with a radius extending from the axis of rotation of said carrier to the outer end of the respective leading edge portion, each of said blades of said finishing tools having substantially the shape of a parallelogram and arranged in such a manner that a leading radial line drawn through the outer end of the leading edge and a trailing radial line drawn through the outer end of the trailing edge are located entirely within the respective parallelogram-shaped blade and form with the leading and trailing edge of said blade, respectively, small angles and means for detachably connecting the leading edge portions of said blades to said carrier.

References Cited by the Examiner

UNITED STATES PATENTS

| | | | |
|---|---|---|---|
| 2,181,375 | 11/1939 | Leistner | 94—45 |
| 2,434,408 | 1/1948 | Huffman | 94—45 |
| 2,468,981 | 5/1949 | Huffman | 94—45 |
| 2,860,506 | 11/1958 | Drummond | 94—45 |
| 2,878,730 | 3/1959 | Barnes | 94—45 |

FOREIGN PATENTS

| | | |
|---|---|---|
| 237,980 | 1/1960 | Australia. |
| 1,220,871 | 1/1960 | France. |

JACOB L. NACKENOFF, *Primary Examiner.*